United States Patent
Ueno et al.

(10) Patent No.: US 7,796,848 B2
(45) Date of Patent: Sep. 14, 2010

(54) ELECTRONIC APPARATUS

(75) Inventors: Osamu Ueno, Kanagawa (JP); Masao Funada, Kanagawa (JP); Tsutomu Hamada, Kanagawa (JP); Junji Okada, Kanagawa (JP); Takehiro Niitsu, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 157 days.

(21) Appl. No.: 11/589,473

(22) Filed: Oct. 30, 2006

(65) Prior Publication Data

US 2007/0297727 A1 Dec. 27, 2007

(30) Foreign Application Priority Data

Jun. 8, 2006 (JP) .............................. P2006-159882

(51) Int. Cl.
G02B 6/26 (2006.01)

(52) U.S. Cl. .......................................... 385/25; 385/26

(58) Field of Classification Search ........................ None
See application file for complete search history.

(56) References Cited

U.S. PATENT DOCUMENTS

| | | | | |
|---|---|---|---|---|
| 5,038,031 A | * | 8/1991 | Kurosawa et al. | 250/231.14 |
| 5,949,565 A | * | 9/1999 | Ishida | 398/131 |
| 6,470,132 B1 | * | 10/2002 | Nousiainen et al. | 385/146 |
| 7,162,209 B2 | * | 1/2007 | Ono | 455/90.3 |
| 7,194,154 B2 | * | 3/2007 | Hyatt | 385/25 |
| 2004/0223689 A1 | * | 11/2004 | Lempkowski et al. | 385/26 |
| 2005/0201693 A1 | | 9/2005 | Korenaga et al. | |
| 2007/0032275 A1 | * | 2/2007 | Suzuki et al. | 455/575.3 |
| 2007/0153457 A1 | * | 7/2007 | Hosoya et al. | 361/681 |
| 2008/0070649 A1 | * | 3/2008 | Uchida | 455/575.4 |

FOREIGN PATENT DOCUMENTS

| | | |
|---|---|---|
| CN | 2598274 Y | 1/2004 |
| CN | 1668049 | 9/2005 |
| JP | 10-97346 | 2/1996 |
| JP | 8-46835 | 4/1998 |

* cited by examiner

*Primary Examiner*—Mike Stahl
(74) *Attorney, Agent, or Firm*—Fildes & Outland, P.C.

(57) ABSTRACT

An electronic apparatus includes: a first frame and a second frame that are relatively movable; a frame boundary portion that is provided between the first frame and the second frame; a light emitting portion that is provided on the first frame and transmits an optical signal; a light receiving portion that is provided on the second frame and receives the optical signal; and an optical transmission medium that transmits the optical signal between the frame boundary portion and at least one of the light emitting portion and the light receiving portion, wherein an optical transmission between the light emitting portion and the light receiving portion via the optical transmission medium is effected at the frame boundary portion by a spatial optical transmission.

13 Claims, 12 Drawing Sheets

US 7,796,848 B2

ELECTRONIC APPARATUS

BACKGROUND

1. Technical Field

The present invention relates to an electronic apparatus such as a notebook-type personal computer, a portable telephone, or the like of a folding type, a sliding type, or the like, and more particularly to an electronic apparatus excelling in electromagnetic noise characteristics and excelling in moving characteristics and mountability.

2. Related Art

In recent years, various portable electronic apparatuses have been developed. While a compact size is required for a portable electronic apparatus in light of portability, performance and functions which are not inferior to desktop-type electronic apparatuses. For this reason, foldable shapes are adopted as the shapes of many portable electronic apparatuses.

SUMMARY

According to an aspect of the present invention, an electronic apparatus comprising: a first frame and a second frame that are relatively movable; a frame boundary portion that is provided between the first frame and the second frame; a light emitting portion that is provided on the first frame and transmits an optical signal; a light receiving portion that is provided on the second frame and receives the optical signal; and an optical transmission medium that transmits the optical signal between the frame boundary portion and at least one of the light emitting portion and the light receiving portion, wherein an optical transmission between the light emitting portion and the light receiving portion via the optical transmission medium is effected at the frame boundary portion by a spatial optical transmission.

According to the electronic apparatus having the above-described arrangement, since there is no need to provide an electric cable between the circuit board and the light emitting/receiving portion, it becomes possible to suppress the effect of electromagnetic noise in communication between circuit boards to a minimum. In addition, it becomes unnecessary to pass the optical waveguide through the hinge portion before fitting the optical waveguide to the light emitting/receiving portion. Further, the optical waveguide is prevented from being twisted by the movement of the hinge portion. The "spatial optical transmission" is not limited to the optical transmission via a gas such as air, but also includes optical transmission via a liquid or gel-like light transmitting medium, an optical element such as a lens, or the like.

BRIEF DESCRIPTION OF THE DRAWINGS

Exemplary embodiments of the present invention will be described in detail based on the following figures, wherein:

FIGS. 10A and 10B are diagrams illustrating the configuration of optical connection in the electronic apparatus in accordance with a seventh embodiment of the invention, in which FIG. 10A shows a state in which the laptop section is closed, and FIG. 10B shows a state in which the laptop section is slid;

FIGS. 11A and 11B are diagrams illustrating the configuration of optical connection in the electronic apparatus in accordance with an eighth embodiment of the invention, in which FIG. 11A shows a state in which the laptop section is closed, and FIG. 11B shows a state in which the laptop section 3 is open; and FIGS. 12A to 12C are diagrams illustrating the configuration of optical connection in the electronic apparatus in accordance with a ninth embodiment of the invention, in which FIG. 12A is a plan view, FIG. 12B is an end view of a first optical waveguide, and FIG. 12C is an end view of a second optical waveguide.

DETAILED DESCRIPTION

First Embodiment

Figure 1:
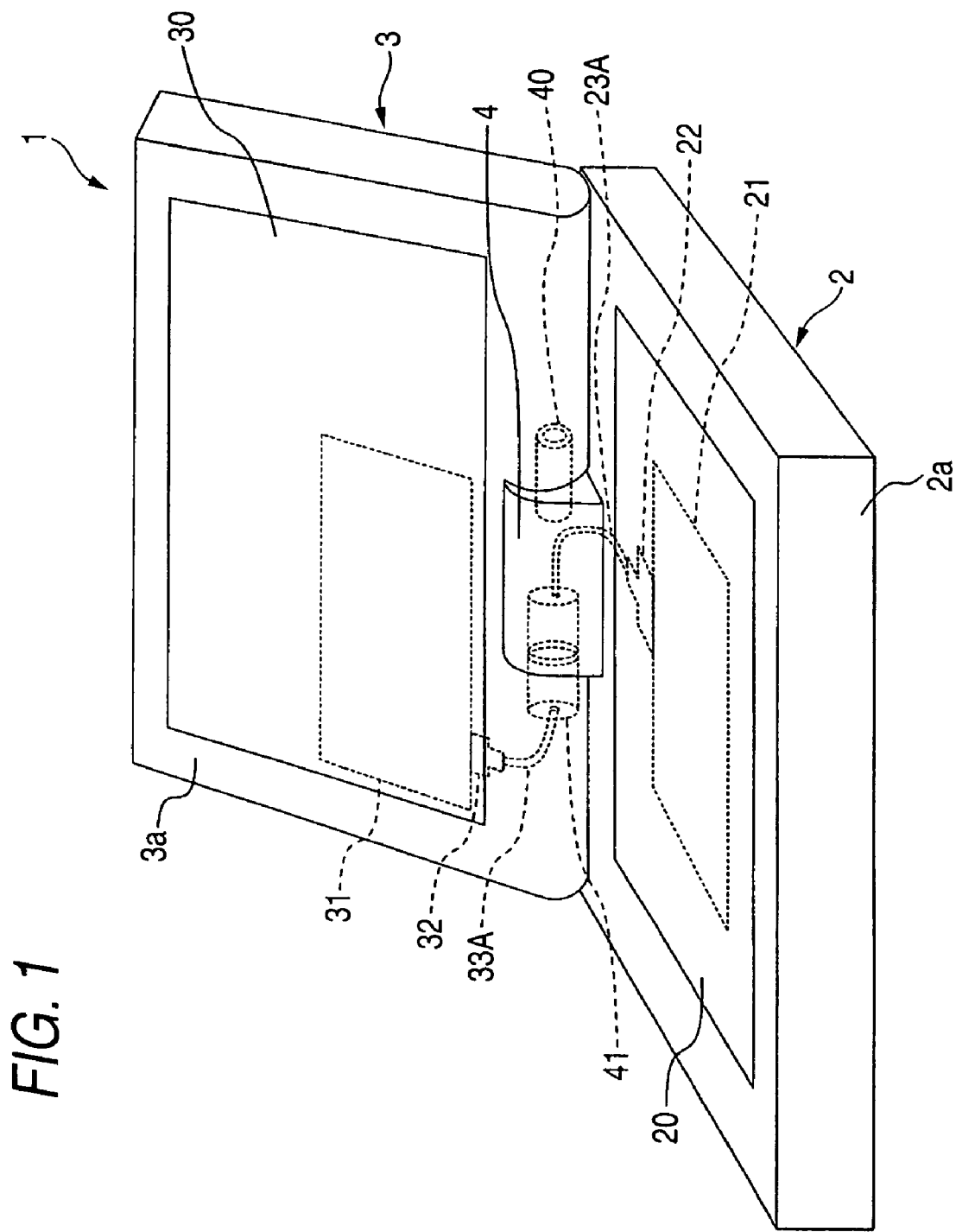
FIG. 1 is an external view of an electronic apparatus in accordance with a first embodiment of the invention.
Figure 2:
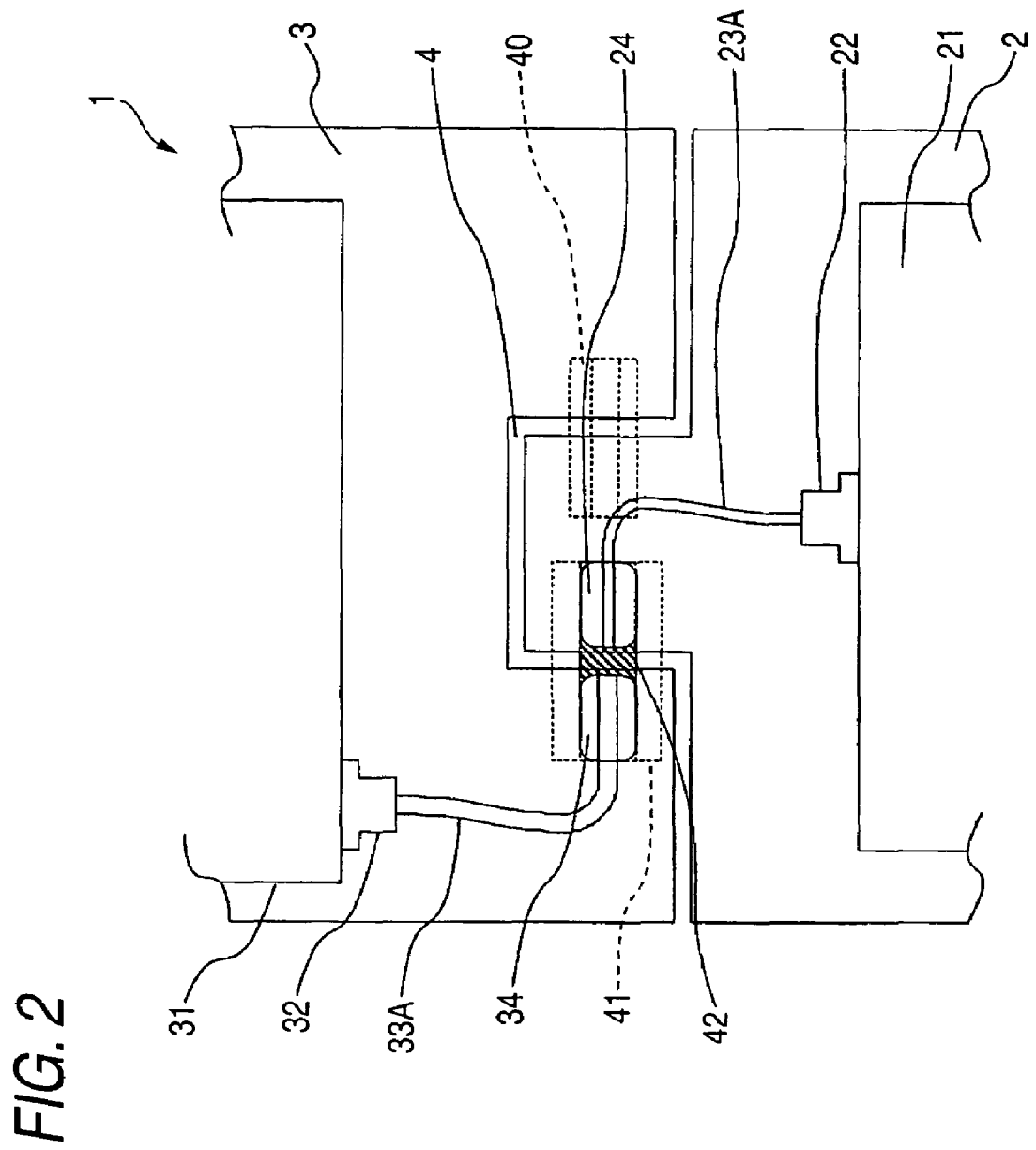
FIG. 2 is a diagram illustrating the configuration of optical connection in the electronic apparatus in accordance with the first embodiment.

FIG. 1 is an external view of an electronic apparatus in accordance with a first embodiment of the invention. FIG. 2 is a diagram illustrating the configuration of optical connection in the electronic apparatus.

This electronic apparatus 1 is, for example, a notebook-type personal computer, and includes a main body section 2 serving as a first frame having a keyboard 20, as well as a laptop section 3 serving as a second frame having a display portion 30 such as a liquid crystal display. The laptop section 3 is rotatable relative to the main body section 2 by means of rotating mechanisms 40 and 41 provided in a hinge portion 4. Furthermore, the main body section 2 and the laptop section 3 are optically connected to each other by means of the rotating mechanism 41 between the main body section 2 and the laptop section 3, i.e., by a frame boundary portion. It should be noted that the electronic apparatus 1 may include a portion for electrically connecting the main body section 2 and the laptop section 3. In addition, the electronic apparatus 1 may have input devices such as a mouse, an electronic pen, a touch panel, and the like in substitution of or in addition to the keyboard 20.

A first circuit board 21, a light emitting portion 22, and a first optical waveguide 23A serving as an optical transmission medium are disposed in the main body section 2, while a second circuit board 31, a light receiving portion 32, and a second optical waveguide 33A serving as an optical transmission medium are disposed in the laptop section 3.

The light emitting portion 22 is mounted on the first circuit board 21, and converts an electrical signal from the first circuit board 21 into an optical signal, and it is possible to use, for instance, a laser diode, a light emitting diode, or the like.

The light receiving portion 32 is mounted on the second circuit board 31, receives the optical signal emitted from the light emitting portion 22, converts it into an electrical signal, and transmits it to the second circuit board 31, and it is possible to use, for instance, a photo diode or the like.

The first circuit board 21 is a board for performing control and the like in the main body section 2 and includes, for example, a drive circuit for driving the light emitting portion 22 and a CPU for controlling the respective parts in the electronic apparatus 1. The CPU generates or selects image data on the basis of the operation of the input device such as the keyboard 20, controls the drive circuit on the basis of that image data, and causes the light emitting portion 22 to output an optical signal.

The second circuit board 31 is a board for performing control and the like in the laptop section 3 and includes, for example, a processing circuit for generating display data by subjecting the electrical signal photoelectrically converted from the light received by the light receiving portion 32 to processing such as amplification, as well as a display drive circuit for driving the display portion 30 on the basis of the display data.

The first optical waveguide 23A is optically connected to the light emitting portion 22, and transmits the optical signal generated by the light emitting portion 22. An optical fiber, for instance, is used as the first optical waveguide 23A. However, the first optical waveguide is not limited to the optical fiber, and the first optical waveguide may be a cable capable of transmitting an optical signal, or may be a polymer waveguide or the like.

The second optical waveguide 33A is optically connected to the light receiving portion 32, and an incident end face of the second optical waveguide 33A is disposed at a predetermined distance from an emergent end face of the first optical waveguide 23A. The second optical waveguide 33A transmits the optical signal transmitted through the first optical waveguide 23A to the light receiving portion 32. An optical fiber, for instance, is used as the second optical waveguide 33A in the same way as the first optical waveguide 23A. However, the second optical waveguide is not limited to the optical fiber, and the second optical waveguide may be a cable capable of transmitting an optical signal, or may be a polymer waveguide or the like.

Of the left and right rotating mechanisms 40 and 41, the right rotating mechanism 40, although not shown, consists of a combination of a shaft and a bearing which are relatively rotatable. The arrangement provided is such that the shaft is provided on one of the main body section 2 and the laptop section 3, while the bearing is provided on the other one of the main body section 2 and the laptop section 3. The rotating mechanism 41 will be described below.

(Configuration of the Rotating Mechanism)

Figure 3:
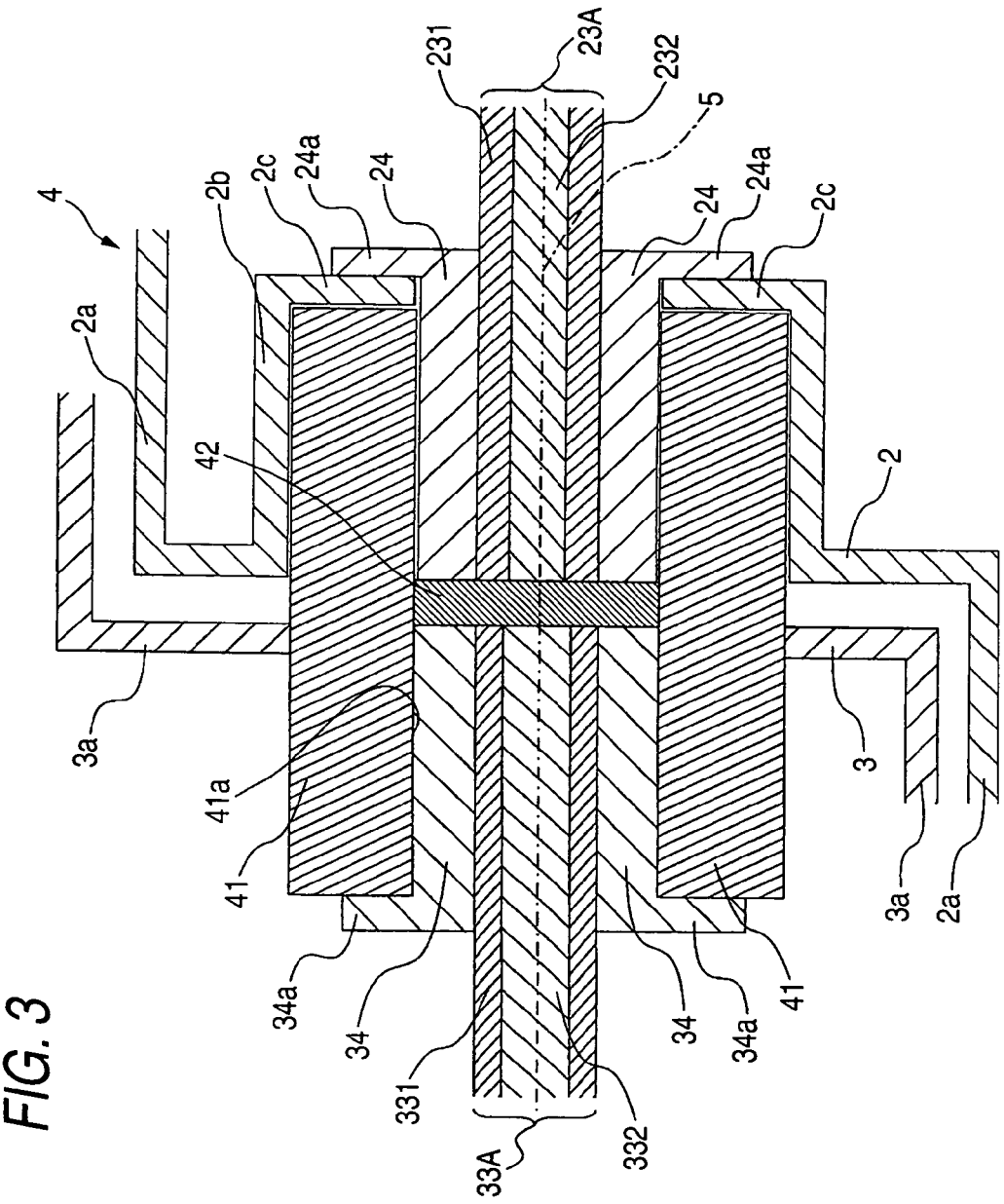
FIG. 3 is a cross-sectional view of a rotating mechanism and its peripheries in accordance with the first embodiment.

FIG. 3 is a cross-sectional view of the rotating mechanism 41 and its peripheries. The rotating mechanism 41 is provided in the hinge portion 4 connecting the main body section 2 and the laptop section 3.

The rotating mechanism 41 is arranged to rotate integrally with the rotation of a laptop section case 3a. Namely, the rotating mechanism 41 has a hollow cylindrical shape having an axially penetrating hollow portion 41a, and its outer peripheral surface is fixed to the laptop section case 3a. A main body section case 2a has a bearing portion 2b for supporting the outer periphery of the rotating mechanism 41, as well as a collar portion 2c for restricting the position of the inner end face of the rotating mechanism 41. In addition, the rotating mechanism 41 is formed of a resin such as a polyamide-based resin having wear resistance or a metal such as SUS having corrosion resistance.

The main body section case 2a which is the exterior of the main body section 2 and the laptop section case 3a which is the exterior of the laptop section 3 are formed of a resin such as a nonflammable polycarbonate or a light metal such as aluminum, an aluminum alloy, or a magnesium alloy.

The first optical waveguide 23A has one end optically coupled to the light emitting portion 22 and the other end fixed to a first ferrule 24. The first ferrule 24 is fitted into the hollow portion 41a from one side of the rotating mechanism 41, and is arranged to be relatively rotatable relative to the rotating mechanism 41.

The second optical waveguide 33A has one end optically coupled to the light receiving portion 32 and the other end fixed to a second ferrule 34. The second ferrule 34 is fitted into the hollow portion 41a from the other side of the rotating mechanism 41, and is arranged to be integrally rotatable with the rotating mechanism 41. As a result, the respective central axes of the first optical waveguide 23A and the second optical waveguide 33A are substantially aligned with a rotating shaft 5 of the rotating mechanism 41.

The first ferrule 24 has an outside diameter slightly smaller than the inside diameter of the hollow portion 41a of the rotating mechanism 41, and has a collar portion 24a which is fixed to the collar portion 2c provided on the main body section case 2a. As a result, the first optical waveguide 23A is fixed to the main body section case 2a side.

The second ferrule 34 has a collar portion 34a abutting against a side face of the rotating mechanism 41, whereby a gap is formed in the hollow portion 41a of the rotating mechanism 41 between the end face of the first optical waveguide 23A and the end face of the second optical waveguide 33A. An index-matching oil 42 is filled in that gap.

The first and second ferrules 24 and 34 are formed of, for example, Zr, glass, a plastic material such as polyetherketone, a metal such as SUS, or the like. In a case where a plastic material is used, the first and second ferrules 24 and 34 may be formed by injection molding or the like, and a fiber insertion hole may be formed in a round rod material by machining or the like. In addition, in a case where a metal is used, the first and second ferrules 24 and 34 may be formed by electroforming, and a fiber insertion hole may be formed in a round rod material by machining or the like.

As the index-matching oil 42, it is possible to use a transparent liquid or a gel-like material, such as a silicone-based material, which has a refractive index similar to the refractive indices of cores 232 and 332 of the optical waveguides 23A and 33A. As a result, it is possible to reduce the Fresnel loss of the optical signal passing between the first and second optical waveguides 23A and 33A.

In addition, the first optical waveguide 23A and the second optical waveguide 33A respective consist of a clad 231 and the core 232 as well as a clad 331 and the core 332. At this time, the diameter of the core 332 of the second optical waveguide 33A should preferably be set to be slightly larger than the diameter of the core 232 of the first optical waveguide 23A. The gap between the end face of the first optical waveguide 23A and the end face of the second optical waveguide 33A is slight. Although the index-matching oil 42 is filled in that gap, the optical loss in that gap is minimized by making larger the diameter of the core 332 on the light receiving side, thereby making it possible to receive a greater amount of light.

(Operation of the Rotating Mechanism)

Figure 4:
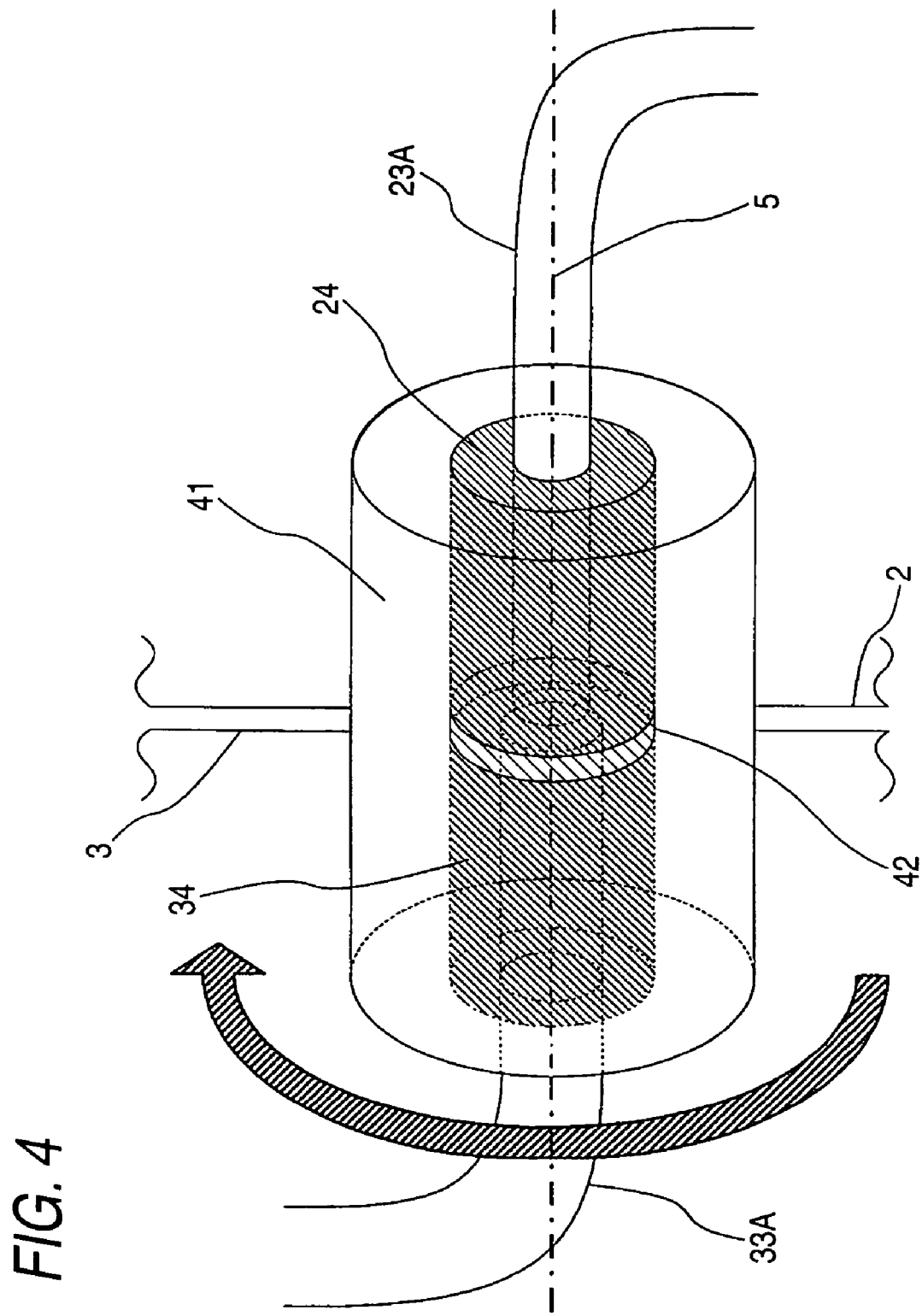
FIG. 4 is a perspective view illustrating the operation of the rotating mechanism in accordance with the first embodiment.

FIG. 4 is a perspective view illustrating the operation of the rotating mechanism 41. If the laptop section 3 is rotated relative to the main body section 2 in the direction indicated by the arrow in the drawing, the second optical waveguide 33A, the second ferrule 34, and the rotating mechanism 41 rotate about the rotating shaft 5 integrally with the laptop section 3. Since the first optical waveguide 23A and the first ferrule 24 are fixed to the main body section 2 side, the second optical waveguide 33A rotates relative to the first optical waveguide 23A. Since the index-matching oil 42 is filled in the gap between the first and second optical waveguides 23A and 33A, the first and second optical waveguides 23A and 33A are optically coupled to each other by means of the index-matching oil 42.

As a result, when the laptop section 3 is rotated, the first optical waveguide 23A is prevented from moving and twisting with respect to the main body section 2. Further, the second optical waveguide 33A is prevented from moving and twisting with respect to the laptop section 3. On the other hand, the mutual positional relationship between the first optical waveguide 23A and the second optical waveguide 33A produces a twist owing to the rotation of the laptop section 3. However, since the first optical waveguide 23A and the second optical waveguide 33A are not adhered to each other, a physical force is not applied by the rotation. In addition, even if a twist occurs in the positional relationship, since the mutual central axes are aligned, no effect is exerted on the transmission of the optical signal.

It should be noted that, to allow the laptop section 3 to rotate smoothly with respect to the main body section 2 by the rotating mechanism 41, such arrangements as the provision of an unillustrated bearing between the rotating mechanism 41 and the main body section 2 and application of a lubricant therebetween are effective.

Second Embodiment

Figure 5:
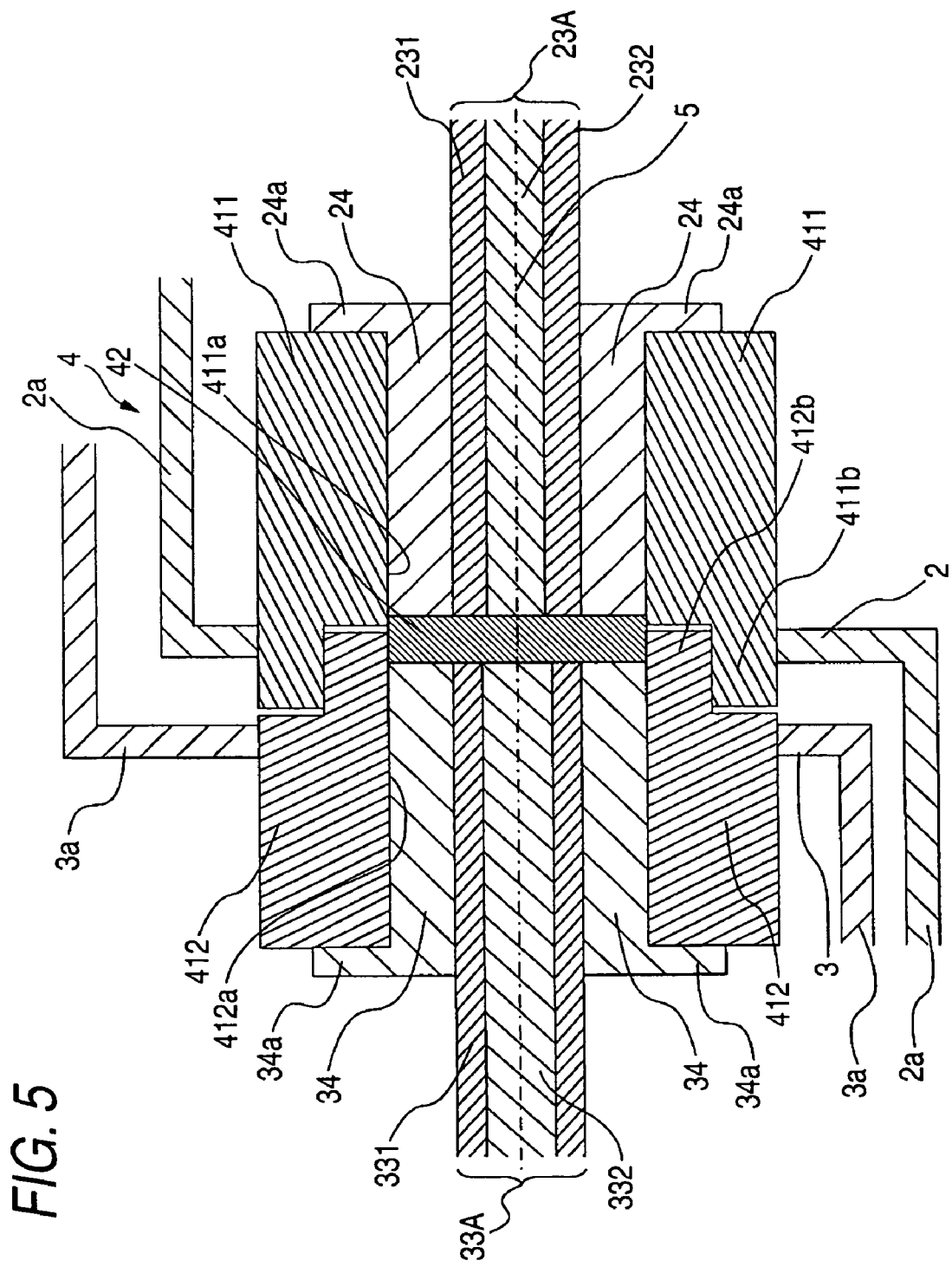
FIG. 5 is a diagram illustrating the rotating mechanism in accordance with a second embodiment of the invention.

FIG. 5 shows the rotating mechanism in accordance with a second embodiment of the invention. Although the rotating mechanism described in the first embodiment is fixed to only the laptop section 3, the rotating mechanism in the second embodiment is divided into two parts, a first rotating mechanism 411 and a second rotating mechanism 412, the first rotating mechanism 411 being fixed to the main body section 2, the second rotating mechanism 412 being fixed to the laptop section 3.

The first rotating mechanism 411 has an axially penetrating hollow portion 411a, and has at its end face on the second rotating mechanism 412 side a recessed portion 411b which is coaxial with the hollow portion 411a. The outer peripheral surface of the first rotating mechanism 411 is fixed to the main body section case 2a.

The second rotating mechanism 412 has an axially penetrating hollow portion 412a, and has at its end face on the first rotating mechanism 411 side a projecting portion 412b which is coaxial with the hollow portion 412a and is fitted in the recessed portion 411b of the first rotating mechanism 411. The outer peripheral surface of the second rotating mechanism 412 is fixed to the laptop section case 3a.

Unlike the first embodiment, the first ferrule 24 is fitted in the hollow portion 411a of the first rotating mechanism 411, thereby allowing the first optical waveguide 23A to be fixed to the main body section case 2a side.

In the same way as the first embodiment, the second ferrule 34 has the collar portion 34a abutting against a side face of the second rotating mechanism 412, whereby a gap is formed in the hollow portions 411a and 412a of the first and second rotating mechanisms 411 and 412 between the end face of the first optical waveguide 23A and the end face of the second optical waveguide 33A. The index-matching oil 42 is filled in that gap.

If the laptop section 3 is rotated relative to the main body section 2, the second optical waveguide 33A, the second ferrule 34, and the second rotating mechanism 412 rotate about the rotating shaft 5 integrally with the laptop section 3. Since the first optical waveguide 23A, the first ferrule 24, and the first rotating mechanism 411 are fixed to the main body section 2 side, the second optical waveguide 33A rotates relative to the first optical waveguide 23A. Since the index-matching oil 42 is filled in the gap between the first and second optical waveguides 23A and 33A, the first and second optical waveguides 23A and 33A are optically coupled to each other by means of the index-matching oil 42.

Third Embodiment

Figure 6:
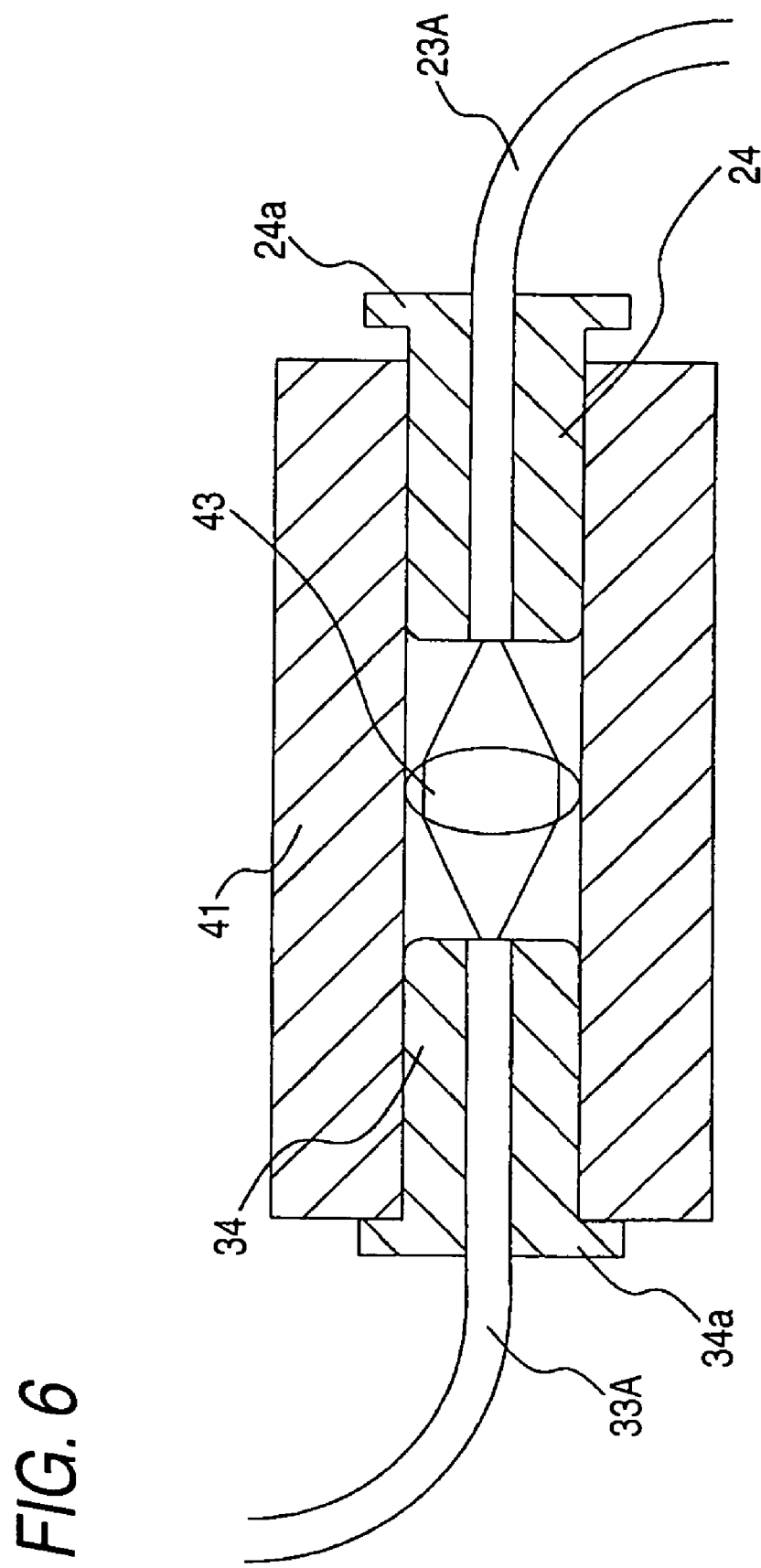
FIG. 6 is a diagram illustrating the rotating mechanism in accordance with a third embodiment of the invention.

FIG. 6 is a diagram illustrating the rotating mechanism in accordance with a third embodiment of the invention. It should be noted that in the drawing the illustration of the main body section case 2a and the laptop section case 3a is omitted.

In this embodiment, in the first embodiment, one convex lens 43 is disposed between the first optical waveguide 23A and the second optical waveguide 33A. The distance between end faces of the first and second optical waveguides 23A and 33A is set to two times the focal length of the convex lens 43.

In this embodiment, the light transmitted through the first optical waveguide 23A is diffused when it is emitted from its terminal portion, but the diffused light is refracted on passing through the convex lens 43, and is focused on the terminal portion of the second optical waveguide 33A. Then, the focused light is directed toward the light receiving portion 32 through the second optical waveguide 33A.

Fourth Embodiment

Figure 7:
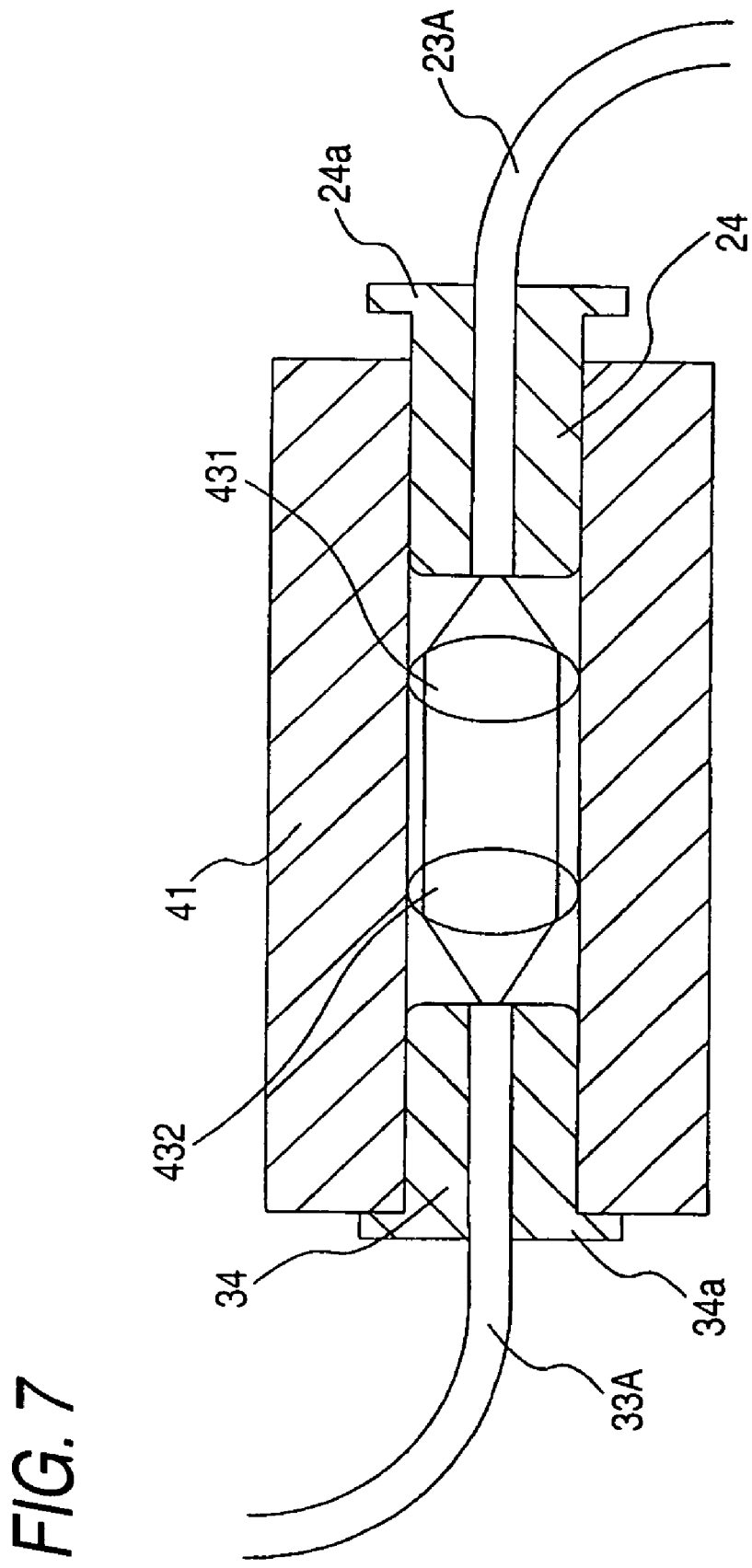
FIG. 7 is a diagram illustrating the rotating mechanism in accordance with a fourth embodiment of the invention.

FIG. 7 is a diagram illustrating the rotating mechanism in accordance with a fourth embodiment of the invention. It should be noted that in the drawing the illustration of the main body section case 2a and the laptop section case 3a is omitted.

As for this embodiment, in the first embodiment, two convex lenses 431 and 432 are disposed between the first optical waveguide 23A and the second optical waveguide 33A.

In this embodiment, the light transmitted through the first optical waveguide 23A is diffused when it is emitted from its terminal portion, but the diffused light is refracted on passing through the first convex lens 431, and is converted to parallel light. The parallel light is refracted again on passing through the second convex lens 432, and is focused on the terminal portion of the second optical waveguide 33A. Then, the focused light is directed toward the light receiving portion 32 through the second optical waveguide 33A.

Fifth Embodiment

Figure 8:
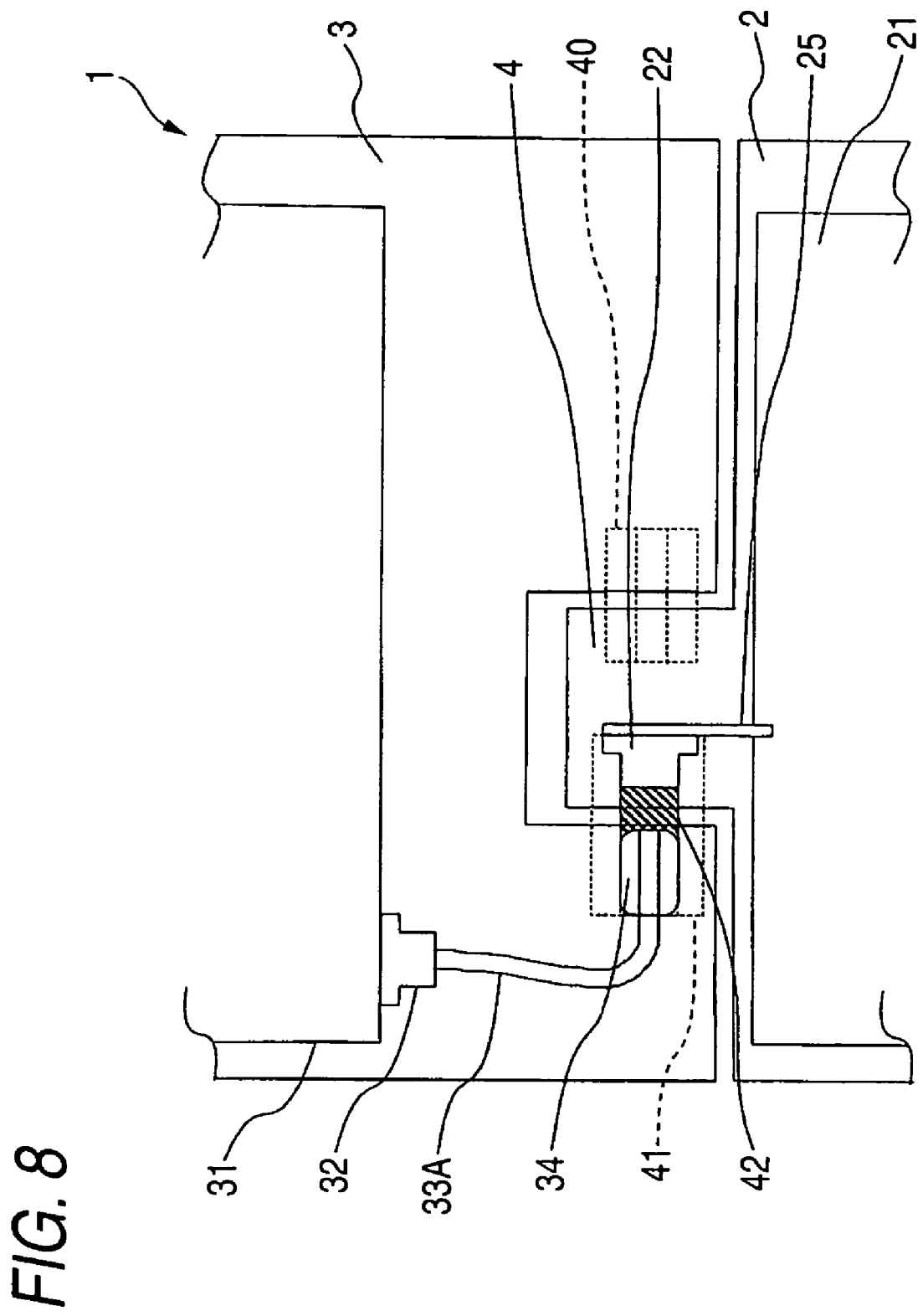
FIG. 8 is a diagram illustrating the configuration of optical connection in the electronic apparatus in accordance with a fifth embodiment.

FIG. 8 is a diagram illustrating the configuration of optical connection in the electronic apparatus in accordance with a fifth embodiment of the invention. As for this embodiment, in the first embodiment, the light emitting portion 22 is disposed in the rotating mechanism 41, and the light emitting portion 22 and the first circuit board 21 on the main body section 2 side are connected by an electric cable 25. The other arrangements are similar to those of the first embodiment.

Instead of the first optical waveguide 23A and the first ferrule 24, the light emitting portion 22 is fitted to one end side of the hollow portion 41a of the rotating mechanism 41. It should be noted that the light emitting portion 22 may be fitted by means of a holding member such as a ferrule.

The first circuit board 21 can be disposed at as close a position as possible to the hinge portion 4, and the length of the electric cable 25 for connecting the light emitting portion 22 and the first circuit board 21 can be minimized, so that the effect of electromagnetic noise can be substantially reduced.

In the same way as the first embodiment, the second ferrule 34 holding the second optical waveguide 33A is fitted in the other end side of the hollow portion 41a of the rotating mechanism 41, and is fixed to the rotating mechanism 41. The index-matching oil 42 is filled in the gap between the light emitting portion 22 and the second optical waveguide 33A.

Sixth Embodiment

Figure 9:
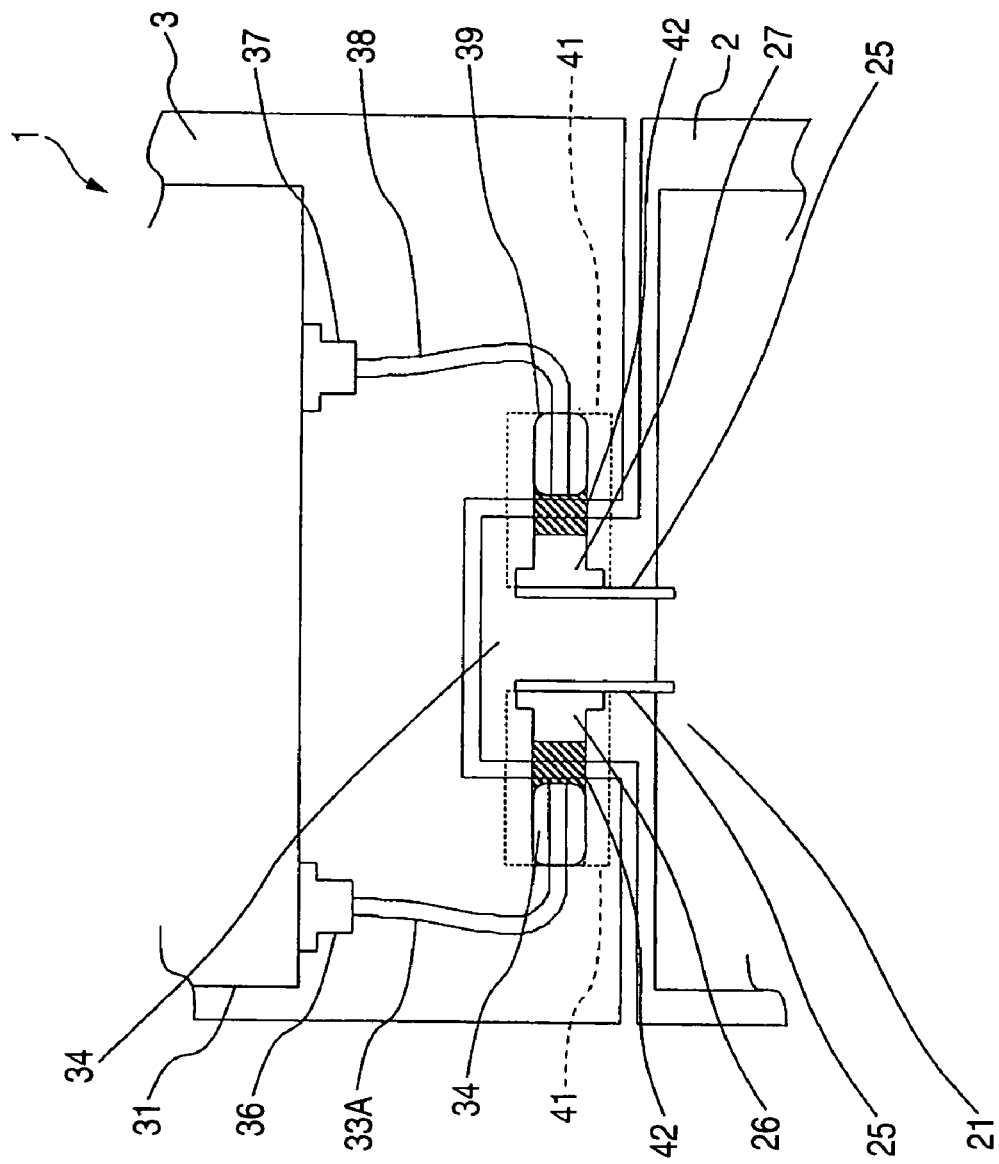
FIG. 9 is a diagram illustrating the configuration of optical connection in the electronic apparatus in accordance with a sixth embodiment.

FIG. 9 is a diagram illustrating the configuration of optical connection in the electronic apparatus in accordance with a sixth embodiment of the invention. As for this embodiment, in the fifth embodiment, two optical connections are made possible to permit optical communication from the first circuit board 21 to the second circuit board 31 and optical communication from the second circuit board 31 to the first circuit board 21.

In this electronic apparatus 1, the rotating mechanism 41 similar to that of the fifth embodiment is disposed inn each of left and right sides of the hinge portion 4, so that the laptop section 3 is rotatable relative to the main body section 2 by the two rotating mechanisms 41. The display portion 30 of the laptop section 3 is made a touch panel.

The main body section 2 has two electric cables for respectively connecting the first circuit board 21 and a first light emitting portion 26, and the first circuit board 21 and a first light receiving portion 27.

The laptop section 3 has the second circuit board 31; a second light receiving portion 36 and a second light emitting portion 37 mounted on the second circuit board 31; the second optical waveguide 33A optically connected to the second light receiving portion 36; and a third optical waveguide 38 optically connected to the second light emitting portion 37.

The index-matching oil 42 is filled in the gaps between the first light emitting portion 26 and the second optical waveguide 33A in the hollow portions 41a of the left and right rotating mechanisms 41 and between the first light receiving portion 27 and the third optical waveguide 38 therein, respectively.

The first circuit board 21 is a board for performing control and the like in the main body section 2 and includes, for example, a drive circuit for driving the first light emitting portion 26, a processing circuit for subjecting the electrical signal photoelectrically converted from the light received by the first light receiving portion 27 to processing such as amplification, and a CPU for controlling the respective parts in the electronic apparatus 1. The CPU generates or selects image data on the basis of the operation of the input device, such as the keyboard 20, and the touch panel, controls the drive circuit on the basis of that image data, and causes the first light emitting portion 26 to output an optical signal. The first circuit board 21 and the first light emitting portion 26, as well as the first circuit board 21 and the first light receiving portion 27, are respectively connected to each other via the electric cables 25.

The second circuit board 31 is a board for performing control and the like in the laptop section 3 and includes, for example, a processing circuit for generating display data by subjecting the electrical signal photoelectrically converted from the light received by the second light receiving portion 36 to processing such as amplification, a drive circuit for outputting the input data from the touch panel as an optical signal by driving the second light emitting portion 37, and a display drive circuit for driving the display portion 30 on the basis of the display data.

(Operation of the Sixth Embodiment)

Next, a description will be given of the operation of the sixth embodiment. When a user operates the keyboard 20, the CPU on the first circuit board 21 imparts a drive signal to the first light emitting portion 26 via the electric cable 25 by controlling the drive circuit. The first light emitting portion 26 converts the drive signal to an optical signal, and inputs it to the second optical waveguide 33A.

The optical signal inputted to the second optical waveguide 33A propagates through the second optical waveguide 33A, is received and converted to an electrical signal by the second light receiving portion 36, and is transmitted to the second circuit board 31. The display drive circuit of the second circuit board 31 displays an image on the display portion 30.

When the user touches the touch panel of the display portion 30 with his or her finger to select an item, the second circuit board 31 acquires coordinate information of the item on the touch panel, and an electrical signal representing that coordinate information is converted to an optical signal by the second light emitting portion 37, and is transmitted to the first light receiving portion 27 via the third optical waveguide 38.

The first light receiving portion 27 converts the received optical signal to an electrical signal, and outputs it to the first circuit board 21 via the electric cable 25. The CPU on the first circuit board 21 recognizes the item instructed on the basis of the coordinate information designated on the touch panel, and executes processing corresponding to that item. The transmission and reception of signals are effected between the first circuit board and the second circuit board in the above-described manner, to execute fixed processing.

It should be noted that the light emitting portion 22 and the first circuit board 21 on the main body section 2 side may be connected by an optical waveguide, and the second light receiving portion 36 and the second circuit board 31 on the laptop section 3 side may be connected by an electric cable.

Seventh Embodiment

Figure 10A:
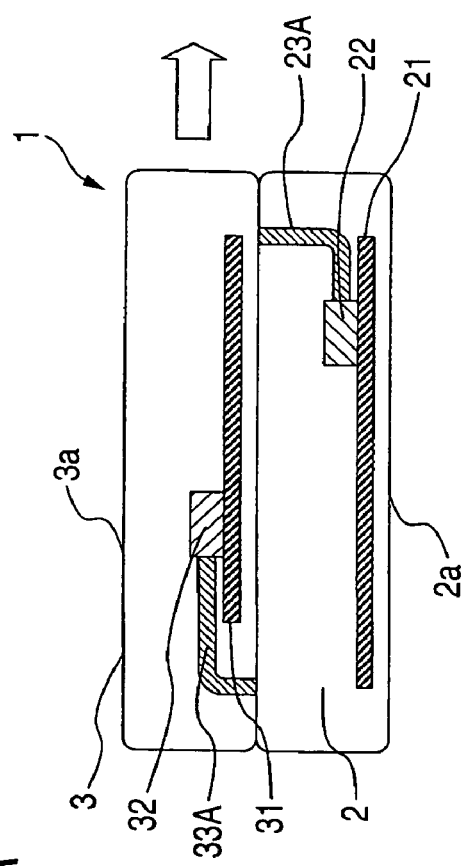
Figure 10B:
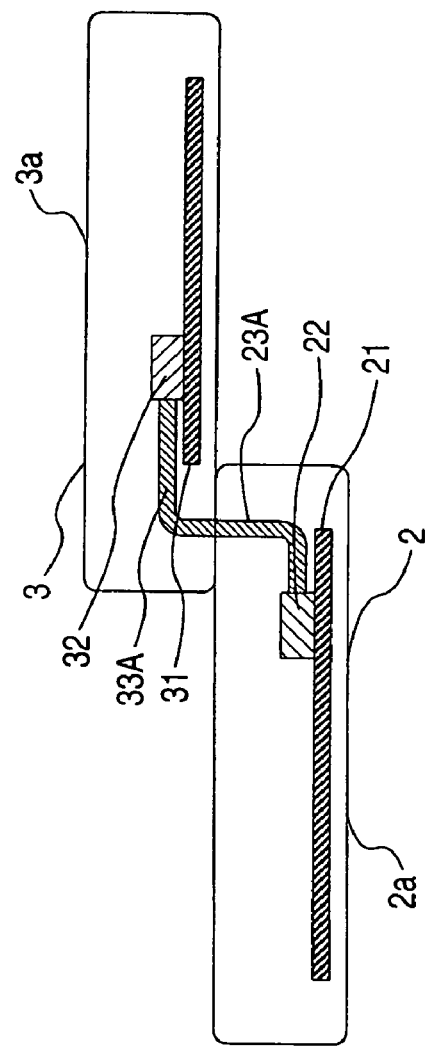

FIGS. 10A and 10B are diagrams illustrating the configuration of optical connection in the electronic apparatus in accordance with a seventh embodiment of the invention. FIG. 10A shows a state in which the laptop section 3 is closed, and FIG. 10B shows a state in which the laptop section 3 is slid and is opened. Although in the first to sixth embodiments the main body section 2 and the laptop section 3 are arranged to be rotatable by rotating mechanisms, the arrangement provided in this embodiment is such that the laptop section 3 is slidable relative to the main body section 2 by a sliding mechanism.

This electronic apparatus 1 is comprised of the main body section 2 and the laptop section 3. When accommodated, the main body section 2 and the laptop section 3 are superposed on each other, as shown in FIG. 10A, and the main body section 2 is covered by the laptop section 3. When in use, however, as the laptop section 3 is slid on the main body section 2, the main body section 2 which was covered by the laptop section 3 becomes usable, as shown in FIG. 10B.

The first circuit board 21, the light emitting portion 22, and the first optical waveguide 23A are disposed in the main body section 2 in the same way as in the first embodiment. Meanwhile, the second circuit board 31, the light receiving portion 32, and the second optical waveguide 33A are disposed in the laptop section 3 in the same way as in the first embodiment.

The light emitting portion 22 is mounted on the first circuit board 21, and has the first optical waveguide 23A connected thereto. The optical signal generated by the light emitting portion 22 advances through the interior of the first optical waveguide 23A. The other terminal portion of the first optical waveguide 23A is directed to that surface of the main body section 2 which opposes the laptop section 3.

The light receiving portion 32 is mounted on the second circuit board 31, and has the second optical waveguide 33A connected thereto. The optical signal which advances through the interior of the second optical waveguide 33A reaches the light receiving portion 32. The other terminal portion of the second optical waveguide 33A is directed to that surface of the laptop section 3 which opposes the main body section 2.

In the accommodated state in which the main body section 2 and the laptop section 3 are superposed, as shown in FIG. 10A, the terminal portion of the first optical waveguide 23A and the terminal portion of the second optical waveguide 33A are distant from each other, so that the optical communication between the first circuit board 21 and the second circuit board 31 is disabled.

However, if the laptop section 3 is slid and the upper surface of the main body section 2 is set in an exposed state, as shown in FIG. 10B, the terminal portion of the first optical waveguide 23A and the terminal portion of the second optical waveguide 33A approaches up to a position where the central axes of the two optical waveguides are substantially aligned with each other. As a result, the optical signal emitted from the first optical waveguide 23A is able to reach the light receiving portion 32 via the second optical waveguide 33A.

Eighth Embodiment

Figure 11A:
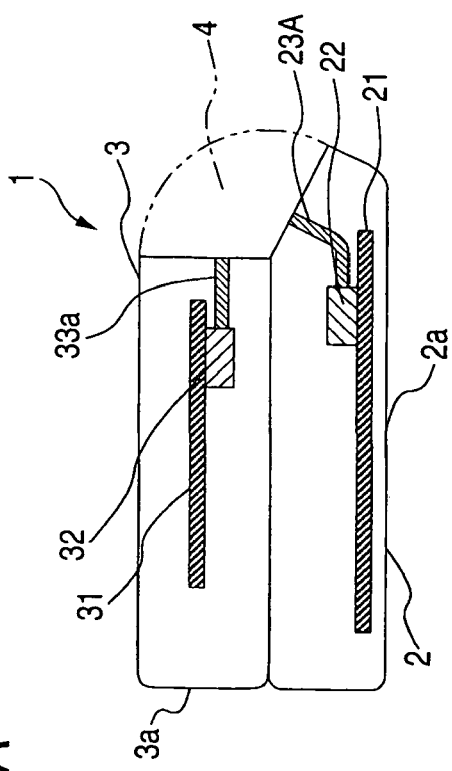
Figure 11B:
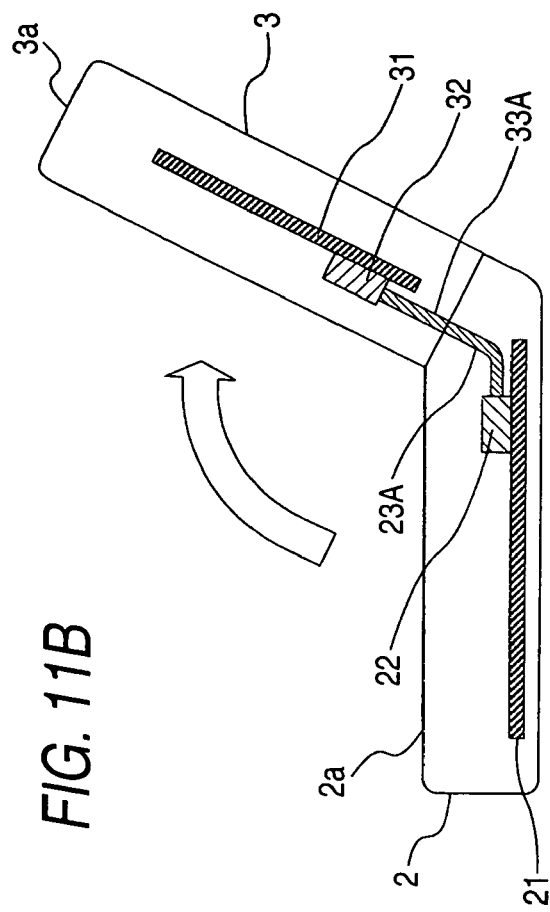

FIGS. 11A and 11B are diagrams illustrating the configuration of optical connection in the electronic apparatus in accordance with an eighth embodiment of the invention. FIG. 11A shows a state in which the laptop section 3 is closed, and FIG. 11B shows a state in which the laptop section 3 is open. In this embodiment, only when the laptop section 3 is rotated relative to the main body section 2 and is set in an open state, optical communication between the two circuit boards 21 and 31 is made possible.

This electronic apparatus 1 is comprised of the main body section 2 and the laptop section 3, and the main body section 2 and the laptop section 3 are connected by the hinge portion 4. The laptop section 3 is rotatable relative to the main body section 2 by means of the hinge portion 4.

The first circuit board 21, the light emitting portion 22, and the first optical waveguide 23A are disposed in the main body section 2. Meanwhile, the second circuit board 31, the light receiving portion 32, and the second optical waveguide 33A are disposed in the laptop section 3.

The light emitting portion 22 is mounted on the first circuit board 21, and has the first optical waveguide 23A connected thereto. The optical signal generated by the light emitting portion 22 advances through the interior of the first optical waveguide 23A. The other terminal portion of the first optical waveguide 23A is directed to that surface of the main body section 2 which faces against the laptop section 3 when the laptop section 3 is set in the open state.

The light receiving portion 32 is mounted on the second circuit board 31, and has the second optical waveguide 33A connected thereto. The optical signal which advances through the interior of the second optical waveguide 33A reaches the light receiving portion 32. The other terminal portion of the second optical waveguide 33A is directed to that surface of the laptop section 3 which faces against the main body section 2 when the laptop section 3 is set in the open state.

In the state in which the laptop section 3 is closed, as shown in FIG. 11A, the terminal portion of the first optical waveguide 23A and the terminal portion of the second optical waveguide 33A are different in direction, so that the optical communication between the first circuit board 21 and the second circuit board 31 is disabled.

However, when the laptop section 3 is opened and is set in the state shown in FIG. 11B, the terminal portion of the first optical waveguide 23A and the terminal portion of the second optical waveguide 33A approaches up to a position where the central axes of the two optical waveguides are substantially aligned with each other. As a result, the optical signal emitted from the first optical waveguide 23A is able to reach the light receiving portion 32 via the second optical waveguide 33A.

Ninth Embodiment

Figure 12A:
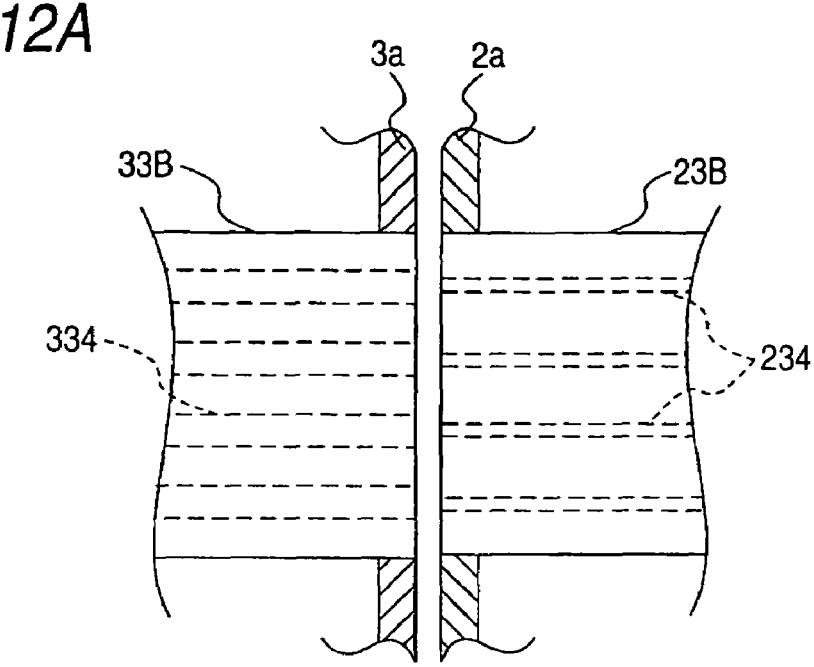
Figure 12B:
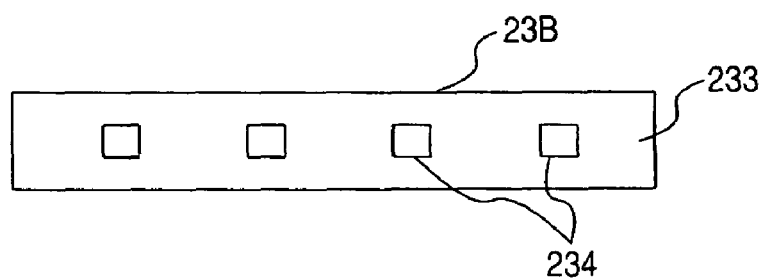
Figure 12C:
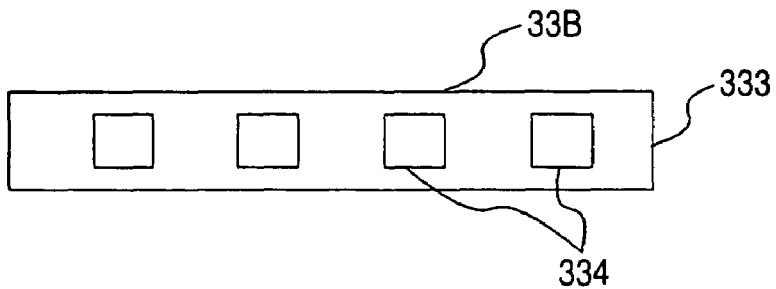

FIGS. 12A to 12C are diagrams illustrating the configuration of optical connection in the electronic apparatus in accordance with a ninth embodiment of the invention. FIG. 12A is a plan view; FIG. 12B is an end view of the first optical waveguide; and FIG. 12C is an end view of the second optical waveguide.

As for this embodiment, in the seventh and eighth embodiments, a first optical waveguide 23B including a plurality of cores 234 and a clad 233 formed around the peripheries of these cores 234 is used as the first optical waveguide. A second optical waveguide 33B including a plurality of cores 334 and a clad 333 formed around the peripheries of these cores 334 is used as the second optical waveguide.

Communication is made possible when the laptop section 3 is opened or slid, and the end faces of the first optical waveguide 23B and the second optical waveguide 33B are set in opposing positions.

It is preferred that the cores 234 and 334 of the first and second optical waveguides 23B and 33B have rectangular cross sections which are uniform in the longitudinal direction, and that the core 334 of the second optical waveguide 33B be slightly larger in size than the core 234 of the first optical waveguide 23B. By so doing, it becomes possible to minimize the optical loss in the gap between the end face of the first optical waveguide 23B and the end face of the second optical waveguide 33B.

The first and second optical waveguides 23B and 33B are polymer optical waveguides, and the cores 234 and 334 are formed of an acrylic resin, an epoxy resin, a polyimide resin, or the like. In addition, the clads 233 and 333 are formed of a fluorinated polymer or the like having a refractive index smaller than the refractive indices of the cores 234 and 334.

Such optical waveguides 23B and 33B can be fabricated as disclosed in JP-A-2004-226941, for example. Namely, a core forming curable resin, which is constituted by a UV curable resin or a thermosetting resin, is filled in a recessed portion formed in the surface of a mold formed of a curable resin. A film base for a clad is joined to the mold surface, and the core forming curable resin is allowed to cure to form a core. Subsequently, the mold is released, and a cladding layer is formed on the core forming surface side of the film base for a clad, thereby fabricating a polymer optical waveguide.

It should be noted that the invention is not limited to the above-described embodiments, and various modifications are possible within a scope that does not change the gist of the invention. In addition, the constituent elements of the above-described embodiments can be arbitrarily combined within a scope that does not change the gist of the invention.

For example, although in the above-described first to fifth embodiments and seventh to ninth embodiments the light emitting portion 22 is disposed on the main body section 2 side, and the light receiving portion 32 is disposed on the laptop section 3 side, the light receiving portion 32 may be disposed on the main body section 2 side, and the light emitting portion 22 may be disposed on the laptop section 3 side.

In addition, the main body section 2 and the laptop section 3 may have both functions of rotation and sliding. For example, in the configuration of the seventh embodiment shown in FIGS. 10A and 10B, an arrangement may be provided such that, as shown in the eighth embodiment shown in FIGS. 11A and 11B, by rotating the laptop section 3, the end faces of the first and second optical waveguides 23A and 33A are opposed to each other to permit optical communication.

What is claimed is:

1. An electronic apparatus comprising:
   a first frame and a second frame that are relatively movable;
   a frame boundary portion that is provided between the first frame and the second frame;
   a light emitting portion that is provided on the first frame and transmits an optical signal;
   a light receiving portion that is provided on the second frame and receives the optical signal; and
   an optical transmission medium that transmits the optical signal between the frame boundary portion and at least one of the light emitting portion and the light receiving portion,
   wherein
   an optical transmission between the light emitting portion and the light receiving portion via the optical transmission medium is effected at the frame boundary portion by a spatial optical transmission,
   the frame boundary portion has a rotating mechanism respectively rotating the first and the second frames,
   the spatial optical transmission is effected when the first and the second frames are at a predetermined specific position,
   a central axis of the optical transmission medium is not parallel to an axis of rotation of the rotating mechanism,
   the spatial optical transmission is in a direction not parallel to the rotation axis, and
   the optical transmission medium is respectively provided between the frame boundary portion and the light emitting portion and between the frame boundary portion and the light receiving portion.

2. The electronic apparatus according to claim 1, wherein the optical transmission medium is an optical fiber.

3. The electronic apparatus according to claim 1, wherein the optical transmission medium is a polymer waveguide.

4. The electronic apparatus according to claim 1,
   wherein
   the optical transmission medium comprises optical fibers respectively provided between the frame boundary portion and the light emitting portion and between the frame boundary portion and the light receiving portion, and
   a core diameter of the optical fiber provided on a side which transmits the optical signal is smaller than a core diameter of the optical fiber provided on a side which receives the optical signal.

5. An electronic apparatus comprising:
   a frame boundary portion;
   a first frame and a second frame that are relatively movable;
   a first light emitting portion that is provided on the first frame and transmits an optical signal;
   a first light receiving portion that is provided on the first frame and receives the optical signal;
   a second light receiving portion that is provided on the second frame and receives the optical signal from the first light emitting portion;
   a second light emitting portion that is provided on the second frame and transmits the optical signal to the first light receiving portion;
   a first optical transmission medium that transmits the optical signal between the frame boundary portion and at least one of the first light emitting portion and the second light receiving portion; and
   a second optical transmission medium that transmits the optical signal between the frame boundary portion and at least one of the first light receiving portion and the second light emitting portion,
   wherein
   an optical transmission between the first light emitting portion and the second light receiving portion via the first optical transmission medium, and an optical transmission between the first light receiving portion and the second light emitting portion via the second optical transmission medium are effected at the frame boundary portion by a spatial optical transmission,
   the frame boundary portion has a rotating mechanism respectively rotating the first and the second frames,
   at least one of said first and second spatial optical transmissions is effected when the first and the second frames are at a predetermined specific position,
   a central axis of at least one of said first and second optical transmission mediums is not parallel to an axis of rotation of the rotating mechanism, and
   at least one of said first and second spatial optical transmissions is in a direction not parallel to the rotation axis.

6. An electronic apparatus comprising:
   a first frame and a second frame that are relatively movable;
   a frame boundary portion that is provided between the first frame and the second frame;
   a light emitting portion that is provided on the first frame and transmits an optical signal;
   a light receiving portion that is provided on the second frame and receives the optical signal; and
   an optical transmission medium that transmits the optical signal between the frame boundary portion and at least one of the light emitting portion and the light receiving portion,
   wherein
   an optical transmission between the light emitting portion and the light receiving portion via the optical transmission medium is effected at the frame boundary portion by a spatial optical transmission,
   the frame boundary portion has a rotating mechanism respectively rotating the first and the second frames,
   the spatial optical transmission is effected when the first and the second frames are at a predetermined specific position,
   a central axis of the optical transmission medium is not parallel to an axis of rotation of the rotating mechanism,
   the frame boundary portion has a sliding mechanism respectively moving the first and second frames in parallel, and
   the spatial optical transmission is effected when the first and second frames are at a predetermined specific position.

7. The electronic apparatus according to claim 6, wherein the optical transmission medium is respectively provided between the frame boundary portion and the light emitting portion and between the frame boundary portion and the light receiving portion.

8. The electronic apparatus according to claim 6, wherein the optical transmission medium is an optical fiber.

9. The electronic apparatus according to claim 6, wherein the optical transmission medium is a polymer waveguide.

10. The electronic apparatus according to claim 6, wherein
the optical transmission medium comprises optical fibers respectively provided between the frame boundary portion and the light emitting portion and between the frame boundary portion and the light receiving portion, and
a core diameter of the optical fiber provided on a side which transmits the optical signal is smaller than a core diameter of the optical fiber provided on a side which receives the optical signal.

11. An electronic apparatus comprising:
a first frame and a second frame that are relatively movable;
a frame boundary portion that is provided between the first frame and the second frame;
a light emitting portion that is provided on the first frame and transmits an optical signal;
a light receiving portion that is provided on the second frame and receives the optical signal; and
an optical transmission medium that transmits the optical signal between the frame boundary portion and at least one of the light emitting portion and the light receiving portion,
wherein
an optical transmission between the light emitting portion and the light receiving portion via the optical transmission medium is effected at the frame boundary portion by a spatial optical transmission,
the frame boundary portion has a rotating mechanism respectively rotating the first and the second frames,
the spatial optical transmission is effected when the first and the second frames are at a predetermined specific position,
a central axis of the optical transmission medium is not parallel to an axis of rotation of the rotating mechanism,
the spatial optical transmission is in a direction not parallel to the rotation axis, and
the optical transmission medium is an optical fiber.

12. The electronic apparatus according to claim 11, wherein
the optical transmission medium comprises optical fibers respectively provided between the frame boundary portion and the light emitting portion and between the frame boundary portion and the light receiving portion, and
a core diameter of the optical fiber provided on a side which transmits the optical signal is smaller than a core diameter of the optical fiber provided on a side which receives the optical signal.

13. An electronic apparatus comprising:
a first frame and a second frame that are relatively movable;
a frame boundary portion that is provided between the first frame and the second frame;
a light emitting portion that is provided on the first frame and transmits an optical signal;
a light receiving portion that is provided on the second frame and receives the optical signal; and
an optical transmission medium that transmits the optical signal between the frame boundary portion and at least one of the light emitting portion and the light receiving portion,
wherein
an optical transmission between the light emitting portion and the light receiving portion via the optical transmission medium is effected at the frame boundary portion by a spatial optical transmission,
the frame boundary portion has a rotating mechanism respectively rotating the first and the second frames,
the spatial optical transmission is effected when the first and the second frames are at a predetermined specific position,
a central axis of the optical transmission medium is not parallel to an axis of rotation of the rotating mechanism,
the spatial optical transmission is in a direction not parallel to the rotation axis,
the optical transmission medium comprises optical fibers respectively provided between the frame boundary portion and the light emitting portion and between the frame boundary portion and the light receiving portion, and
a core diameter of the optical fiber provided on a side which transmits the optical signal is smaller than a core diameter of the optical fiber provided on a side which receives the optical signal.

* * * * *